(12) United States Patent
Araki et al.

(10) Patent No.: US 7,987,664 B2
(45) Date of Patent: Aug. 2, 2011

(54) SECONDARY AIR SUPPLY SYSTEM AND VEHICLE

(75) Inventors: Yuuji Araki, Shizuoka (JP); Ryusuke Kato, Shizuoka (JP); Masaki Torigoshi, Shizuoka (JP); Hiroki Tanabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 393 days.

(21) Appl. No.: 12/275,493

(22) Filed: Nov. 21, 2008

(65) Prior Publication Data
US 2009/0165765 A1 Jul. 2, 2009

(30) Foreign Application Priority Data

Dec. 27, 2007 (JP) ................. 2007-337492

(51) Int. Cl.
*F01N 3/22* (2006.01)
(52) U.S. Cl. ............... 60/305; 60/290; 60/306; 701/109
(58) Field of Classification Search .................. 701/103, 701/109; 123/699; 60/285, 289, 290, 304–306
See application file for complete search history.

(56) References Cited

U.S. PATENT DOCUMENTS

| | | | |
|---|---|---|---|
| 4,075,834 A | 2/1978 | Saito et al. | |
| 4,103,488 A * | 8/1978 | Aoyama | 60/289 |
| 5,235,956 A | 8/1993 | Yoshizaki | |
| 5,285,639 A | 2/1994 | Araki et al. | |
| 5,419,125 A * | 5/1995 | Fukae et al. | 60/289 |
| 5,822,976 A | 10/1998 | Cockerill | |
| 5,832,725 A * | 11/1998 | Sim | 60/289 |
| 6,311,483 B1 * | 11/2001 | Hori et al. | 60/293 |
| 6,752,118 B2 * | 6/2004 | Joos et al. | 123/193.5 |
| 6,912,845 B2 * | 7/2005 | Hirooka | 60/285 |
| 7,131,266 B2 * | 11/2006 | Kita et al. | 60/289 |
| 7,856,815 B2 * | 12/2010 | Demura et al. | 60/324 |
| 2005/0193725 A1 * | 9/2005 | Kaneshiro | 60/305 |
| 2005/0210866 A1 * | 9/2005 | Ito et al. | 60/277 |
| 2007/0068145 A1 * | 3/2007 | Wassmur et al. | 60/289 |

FOREIGN PATENT DOCUMENTS

JP 05-106431 A 4/1993
JP 2006-183513 A 7/2006

OTHER PUBLICATIONS

Araki et al.: "Secondary Air Supply System and Vehicle," U.S. Appl. No. 12/275,531, filed Nov. 21, 2008.
Official Communication issued in European Patent Application No. 08020761.6, mailed on May 11, 2009.

* cited by examiner

*Primary Examiner* — Erick Solis
(74) *Attorney, Agent, or Firm* — Keating & Bennett, LLP

(57) ABSTRACT

A secondary air supply system includes a CPU, a ROM, an air supply pipe, and an air amount adjusting valve. One end of the air supply pipe is connected to an air cleaner box and the other end is connected to an exhaust port. Secondary air in the air cleaner box is supplied to the exhaust port through the air supply pipe. An amount of the secondary air to be supplied from the air supply pipe to the exhaust port is adjusted by the air amount adjusting valve. A target air-fuel ratio depending on a state of the engine is stored in the ROM. The CPU controls the air amount adjusting valve based on the state of the engine so that an air-fuel ratio in the exhaust port is the target air-fuel ratio.

10 Claims, 16 Drawing Sheets

F I G. 1 0
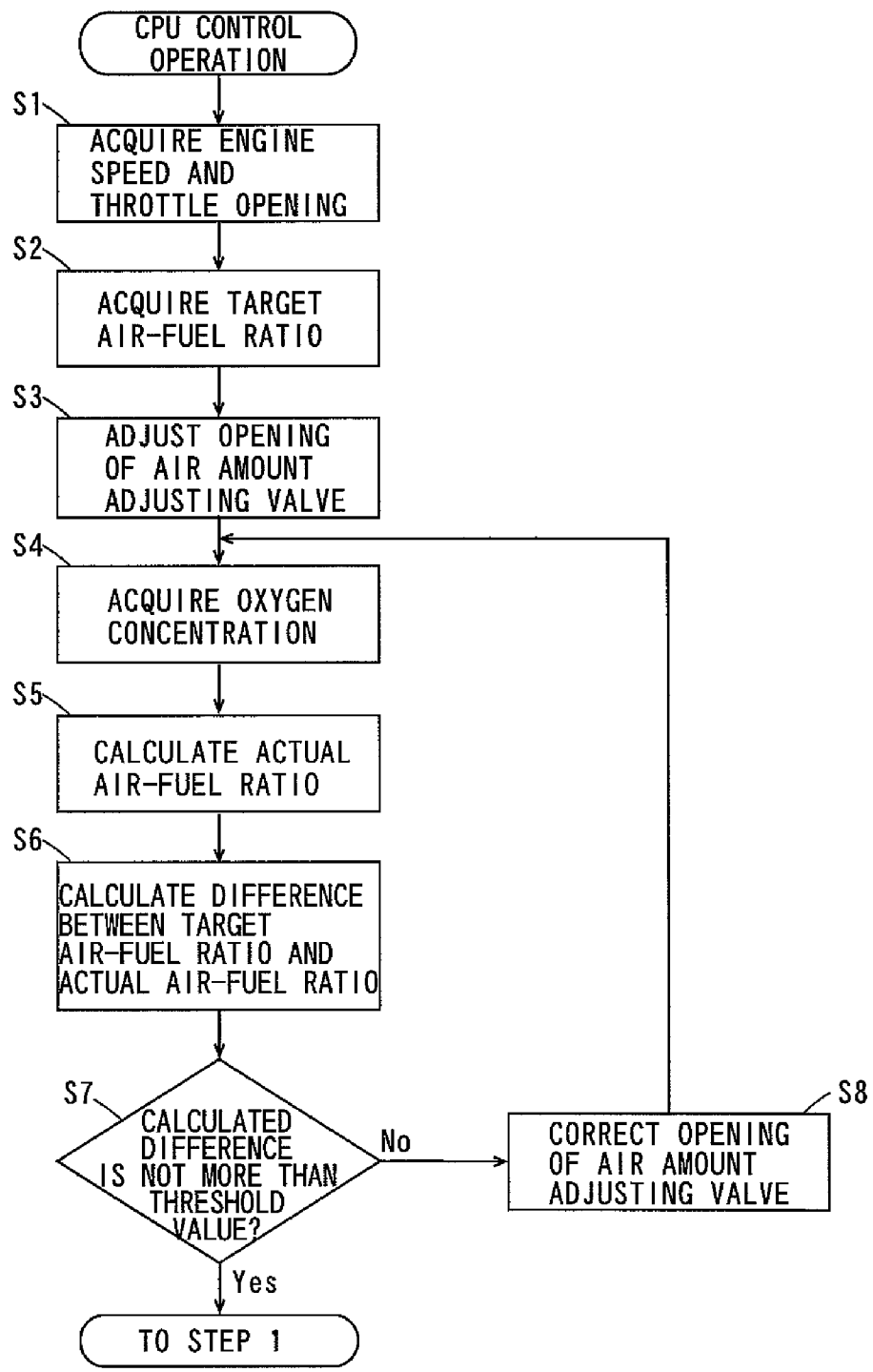

FIG. 11

(P TERM)

| ENGINE SPEED [rpm] \ THROTTLE OPENING [deg.] | 0 | 3 | 90 |
|---|---|---|---|
| 1000 | 0.1 | 0.1 | 0.1 |
| 1250 | 0.1 | 0.1 | 0.1 |
| 2000 | 0.1 | 0.11 | 0.11 |
| 2500 | 0.09 | 0.11 | 0.11 |
| 3000 | 0.06 | 0.18 | 0.2 |
| 4000 | 0.05 | 0.22 | 0.22 |
| 5000 | 0.1 | 0.16 | 0.16 |
| 5500 | 0.1 | 0.1 | 0.1 |
| 6000 | 0.1 | 0.1 | 0.1 |

FIG. 12

(I TERM)

| ENGINE SPEED [rpm] \ THROTTLE OPENING [deg.] | 0 | 3 | 90 |
|---|---|---|---|
| 1000 | 0.05 | 0.05 | 0.05 |
| 1250 | 0.05 | 0.05 | 0.05 |
| 2000 | 0.05 | 0.05 | 0.05 |
| 2500 | 0.05 | 0.05 | 0.05 |
| 3000 | 0.04 | 0.12 | 0.12 |
| 4000 | 0.04 | 0.19 | 0.19 |
| 5000 | 0.05 | 0.2 | 0.2 |
| 5500 | 0.1 | 0.21 | 0.21 |
| 6000 | 0.1 | 0.21 | 0.21 |

FIG. 13

(D TERM)

| ENGINE SPEED [rpm] \ THROTTLE OPENING [deg.] | 0 | 3 | 90 |
|---|---|---|---|
| 1000 | 0.01 | 0.01 | 0.01 |
| 1250 | 0.01 | 0.01 | 0.01 |
| 2000 | 0.01 | 0.01 | 0.01 |
| 2500 | 0.01 | 0.01 | 0.01 |
| 3000 | 0.01 | 0.01 | 0.01 |
| 4000 | 0.01 | 0.01 | 0.01 |
| 5000 | 0.01 | 0.01 | 0.01 |
| 5500 | 0.01 | 0.01 | 0.01 |
| 6000 | 0.01 | 0.01 | 0.01 |

SECONDARY AIR SUPPLY SYSTEM AND VEHICLE

BACKGROUND OF THE INVENTION

1. Field of the Invention

The present invention relates to a secondary air supply system that supplies secondary air to an engine and a vehicle including the same.

2. Description of the Background Art

Conventionally, a technique for supplying secondary air to an exhaust pipe has been developed in order to purify an exhaust gas exhausted from a vehicle (see JP 2006-183513 A, for example).

In a secondary air introduction device described in JP 2006-183513 A, a first tube and a second tube are connected to the exhaust pipe. Secondary air is supplied to the exhaust pipe through the first and second tubes. This causes the exhaust gas in the exhaust pipe to be oxidized, resulting in purification of the exhaust gas.

In a vehicle such as a motorcycle, purification of the exhaust gas using a catalyst device is performed in addition to the purification of the exhaust gas using the secondary air. When an amount of the secondary air supplied to the exhaust pipe increases, however, an amount of oxygen flowing into the catalyst device increases, resulting in lower purification efficiency of the catalyst device. Therefore, it is difficult to effectively improve the efficiency of purifying the exhaust gas simply by providing the foregoing secondary air introduction device and catalyst device in the exhaust pipe.

SUMMARY OF THE INVENTION

In order to overcome the problems described above, preferred embodiments of the present invention provide a secondary air supply system capable of effectively improving the efficiency of purifying an exhaust gas and a vehicle including the same.

According to a first preferred embodiment of the present invention, a secondary air supply system that supplies secondary air to an exhaust passage of an engine includes a supply source of the secondary air, a supply passage through which the secondary air is supplied from the supply source to the exhaust passage, an engine state determination device that determines a state of the engine, a storage device that stores a target air-fuel ratio set in advance depending on the state of the engine, and an air flow adjustment device that adjusts, based on the state of the engine determined by the engine state determination device and the target air-fuel ratio stored in the storage device, an amount of the secondary air to be supplied from the supply passage to the exhaust passage so that an air-fuel ratio in the exhaust passage is the target air-fuel ratio.

According to the secondary air supply system, the secondary air is supplied to the exhaust passage from the supply source through the supply passage. This promotes oxidation reaction of unburned components included in an exhaust gas of the engine. As a result, the unburned components included in the exhaust gas are removed.

Here, purification by the secondary air and purification by a catalyst device must be appropriately combined in order to efficiently purify the exhaust gas. That is, when the secondary air is supplied to the exhaust passage so that the air-fuel ratio in the exhaust passage is lean, the unburned components (HC and CO) in the exhaust gas can be efficiently removed, but the efficiency of purifying nitrogen oxide (NOx) by the catalyst device is reduced. In addition, when the secondary air is supplied to the exhaust passage so that the air-fuel ratio in the exhaust passage is a theoretical air-fuel ratio, the efficiency of purifying the exhaust gas by the catalyst device is improved, but the amount of the unburned components removed by the secondary air decreases.

Therefore, the target air-fuel ratio set in advance depending on the state of the engine is stored in the storage device in the secondary air supply system. Then, the amount of the secondary air to be supplied to the exhaust passage is adjusted by the air flow adjustment device based on the state of the engine determined by the engine state determination device and the target air-fuel ratio stored in the storage device so that the air-fuel ratio in the exhaust passage is the target air-fuel ratio.

In this case, the appropriate target air-fuel ratio depending on the state of the engine is stored in the storage device, so that the amount of the secondary air to be supplied to the exhaust passage can be appropriately adjusted by the air flow adjustment device.

Accordingly, when the state of the engine is a state where the amount of the unburned components removed by the secondary air should be increased, the supply amount of the secondary air is increased, thereby allowing the air-fuel ratio in the exhaust passage to be set on a lean side. This sufficiently promotes the oxidation reaction of the unburned components in the exhaust gas. As a result, the unburned components in the exhaust gas are efficiently removed.

When the state of the engine is a state where the efficiency of purifying the exhaust gas by the catalyst device should be improved, the supply amount of the secondary air is adjusted, thereby making it possible to bring the air-fuel ratio in the exhaust passage close to the theoretical air-fuel ratio. Accordingly, the efficiency of purifying the exhaust gas by the catalyst device is improved.

As described above, the amount of the secondary air to be supplied to the exhaust passage is appropriately adjusted by the air flow adjustment device based on the state of the engine determined by the engine state determination device according to the secondary air supply system. Thus, the purification of the exhaust gas by the secondary air and the purification of the exhaust gas by the catalyst device can be appropriately combined. As a result, the efficiency of purifying the exhaust gas can be effectively improved.

The state of the engine may include a first state and a second state set in advance based on an amount of nitrogen oxide exhausted from a combustion chamber of the engine, and the amount of the nitrogen oxide in the first state may be smaller than the amount of the nitrogen oxide in the second state, and the target air-fuel ratio may include a first air-fuel ratio corresponding to the first state and a second air-fuel ratio corresponding to the second state, and the first air-fuel ratio may be set on a leaner side than the second air-fuel ratio.

According to the secondary air supply system, when the state of the engine is the first state, that is, when the amount of the nitrogen oxide exhausted from the combustion chamber is small, the supply amount of the secondary air is adjusted by the air flow adjustment device so that the air-fuel ratio in the exhaust passage is the first air-fuel ratio.

In addition, when the state of the engine is the second state, that is, when the amount of the nitrogen oxide exhausted from the combustion chamber is large, the supply amount of the secondary air is adjusted by the air flow adjustment device so that the air-fuel ratio in the exhaust passage is the second air-fuel ratio.

Here, the first air-fuel ratio is set on the leaner side than the second air-fuel ratio. Thus, when the amount of the nitrogen oxide exhausted from the combustion chamber is small, the amount of the secondary air supplied to the exhaust passage is increased. This allows the unburned components included in the exhaust gas to be efficiently removed. In addition, since the amount of the nitrogen oxide included in the exhaust gas is small, the nitrogen oxide can be sufficiently prevented from being exhausted to the outside even though the purification efficiency of the catalyst device is decreased.

As a result, the exhaust gas can be efficiently purified.

The secondary air supply system may further include a throttle valve that adjusts an intake amount of the engine, wherein the engine state determination device may determine the state of the engine based on a rotational speed of the engine and an opening of the throttle valve.

In this case, the state of the engine can be easily determined based on the rotational speed of the engine and the opening of the throttle valve. This easily improves the efficiency of purifying the exhaust gas.

The engine state determination device may determine the state of the engine based on the rotational speed of the engine and a pressure in an intake port of the engine. In this case, the first state and the second state can be easily determined. This easily improves the efficiency of purifying the exhaust gas.

The secondary air supply system may further include a first detector that detects the amount of the nitrogen oxide exhausted from the combustion chamber of the engine, wherein the engine state determination device may determine the state of the engine based on the amount of the nitrogen oxide detected by the first detector.

In this case, the state of the engine can be reliably determined based on a result of detection by the first detector. This reliably improves the efficiency of purifying the exhaust gas.

The state of the engine may further include a third state set in advance based on a load applied on the engine, the load in the third state may be higher than the load in the first and second states, and the air flow adjustment device may interrupt supply of the secondary air from the supply passage to the exhaust passage when the state of the engine is determined to be the third state by the engine state determination device.

When the state of the engine is a high load state, the temperature of the exhaust gas increases. Therefore, when the state of the engine is the third state, that is, the high load state, the supply of the secondary air to the exhaust passage is interrupted by the air flow adjustment device in the secondary air supply system.

In this case, since the increase in the temperature of the exhaust gas due to the oxidation reaction of the unburned components is prevented, the temperature of the exhaust gas is prevented from excessively increasing. Thus, the temperature of the catalyst device is prevented from excessively increasing even when the engine is in the high load state. As a result, lower purification efficiency of the catalyst device and degradation of the catalyst device are prevented.

The secondary air supply system may further include a second detector that detects the oxygen concentration in the exhaust passage, wherein the air flow adjustment device may correct a supply amount of the secondary air from the supply passage to the exhaust passage based on the oxygen concentration detected by the second detector.

In this case, the supply amount of the secondary air to the exhaust passage is corrected based on the oxygen concentration detected by the second detector, thus making it possible to easily bring the air-fuel ratio in the exhaust passage close to the target air-fuel ratio.

The first air-fuel ratio may be set to not less than about 15.

In this case, when the amount of the nitrogen oxide exhausted from the combustion chamber is small, the air-fuel ratio in the exhaust passage is set to not less than about 15 and not more than about 19. This reliably promotes the oxidation reaction of the unburned components in the exhaust gas. As a result, the unburned components in the exhaust gas can be more reliably removed.

The second air-fuel ratio may be set to substantially a theoretical air-fuel ratio.

In this case, when the amount of the nitrogen oxide exhausted from the combustion chamber is large, the air-fuel ratio in the exhaust passage is set to substantially the theoretical air-fuel ratio. This improves the purification efficiency of the catalyst device. As a result, the exhaust gas can be efficiently purified.

The supply passage may be connected to the exhaust passage at a position within about 50 mm, for example, from the combustion chamber of the engine.

In this case, it is possible to cause a portion of the secondary air supplied from the supply passage to the exhaust passage to flow into the combustion chamber. This provides stable combustion of the air-fuel mixture in the combustion chamber and stable output of the engine.

According to another preferred embodiment of the present invention, a vehicle includes an engine, a drive wheel, a transmission mechanism that transmits power generated by the engine to the drive wheel, an exhaust passage through which an exhaust gas exhausted from the engine flows, a catalyst device that is provided in the exhaust passage and purifies the exhaust gas exhausted from the engine, and a secondary air supply system that supplies secondary air to the exhaust passage, wherein the secondary air supply system includes a supply source of the secondary air, a supply passage through which the secondary air is supplied from the supply source to the exhaust passage, an engine state determination device that determines a state of the engine, a storage device that stores a target air-fuel ratio set in advance depending on the state of the engine, and an air flow adjustment device that adjusts, based on the state of the engine determined by the engine state determination device and the target air-fuel ratio stored in the storage device, an amount of the secondary air to be supplied from the supply passage to the exhaust passage so that an air-fuel ratio in the exhaust passage is the target air-fuel ratio.

In this vehicle, the power generated by the engine is transmitted to the drive wheel through the transmission mechanism. This causes the vehicle to drive. In addition, the exhaust gas exhausted from the engine is purified by the catalyst device provided in the exhaust passage.

Moreover, the secondary air is supplied from the supply source to the exhaust passage through the supply passage according to the secondary air supply system of this vehicle. This promotes oxidation reaction of unburned components included in the exhaust gas of the engine. As a result, the unburned components included in the exhaust gas are removed.

Here, the purification by the secondary air and the purification by the catalyst device must be appropriately combined in order to efficiently purify the exhaust gas. That is, when the secondary air is supplied to the exhaust passage so that the air-fuel ratio in the exhaust passage is lean, the unburned components (HC and CO) in the exhaust gas can be efficiently removed, but the efficiency of purifying the nitrogen oxide (NOx) by the catalyst device is reduced. In addition, when the secondary air is supplied to the exhaust passage so that the air-fuel ratio in the exhaust passage is a theoretical air-fuel ratio, the efficiency of purifying the exhaust gas by the catalyst device is improved, but the amount of the unburned components removed by the secondary air decreases.

Therefore, the target air-fuel ratio set in advance depending on the state of the engine is stored in the storage device in the secondary air supply system. Then, the amount of the secondary air to be supplied to the exhaust passage is adjusted by the air flow adjustment device based on the state of the engine determined by the engine state determination device and the target air-fuel ratio stored in the storage device so that the air-fuel ratio in the exhaust passage is the target air-fuel ratio.

In this case, the appropriate target air-fuel ratio depending on the state of the engine is stored in the storage device, so that the amount of the secondary air to be supplied to the exhaust passage can be appropriately adjusted by the air flow adjustment device.

Accordingly, when the state of the engine is a state where the amount of the unburned components removed by the secondary air should be increased, the supply amount of the secondary air is increased, thereby allowing the air-fuel ratio in the exhaust passage to be set on a lean side. This sufficiently promotes the oxidation reaction of the unburned components in the exhaust gas. As a result, the unburned components in the exhaust gas are efficiently removed.

When the state of the engine is a state where the efficiency of purifying the exhaust gas by the catalyst device should be improved, the supply amount of the secondary air is adjusted, thereby making it possible to bring the air-fuel ratio in the exhaust passage close to the theoretical air-fuel ratio. Accordingly, the efficiency of purifying the exhaust gas by the catalyst device is improved.

As described above, the amount of the secondary air to be supplied to the exhaust passage is appropriately adjusted by the air flow adjustment device based on the state of the engine determined by the engine state determination device according to the secondary air supply system. Thus, the purification of the exhaust gas by the secondary air and the purification of the exhaust gas by the catalyst device can be appropriately combined. As a result, the efficiency of purifying the exhaust gas can be effectively improved.

According to the preferred embodiments of the present invention, the amount of the secondary air to be supplied to the exhaust passage is appropriately adjusted by the air flow adjustment device based on the state of the engine. Thus, the purification of the exhaust gas by the secondary air and the purification of the exhaust gas by the catalyst device can be appropriately combined. As a result, the efficiency of purifying the exhaust gas can be effectively improved.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 10 is a flowchart showing a control operation of a CPU.

FIG. 11 is a diagram showing an example of a proportional gain.

FIG. 12 is a diagram showing an example of an integral gain.

FIG. 13 is a diagram showing an example of a differential gain.

DETAILED DESCRIPTION OF PREFERRED EMBODIMENTS

Figure 1:
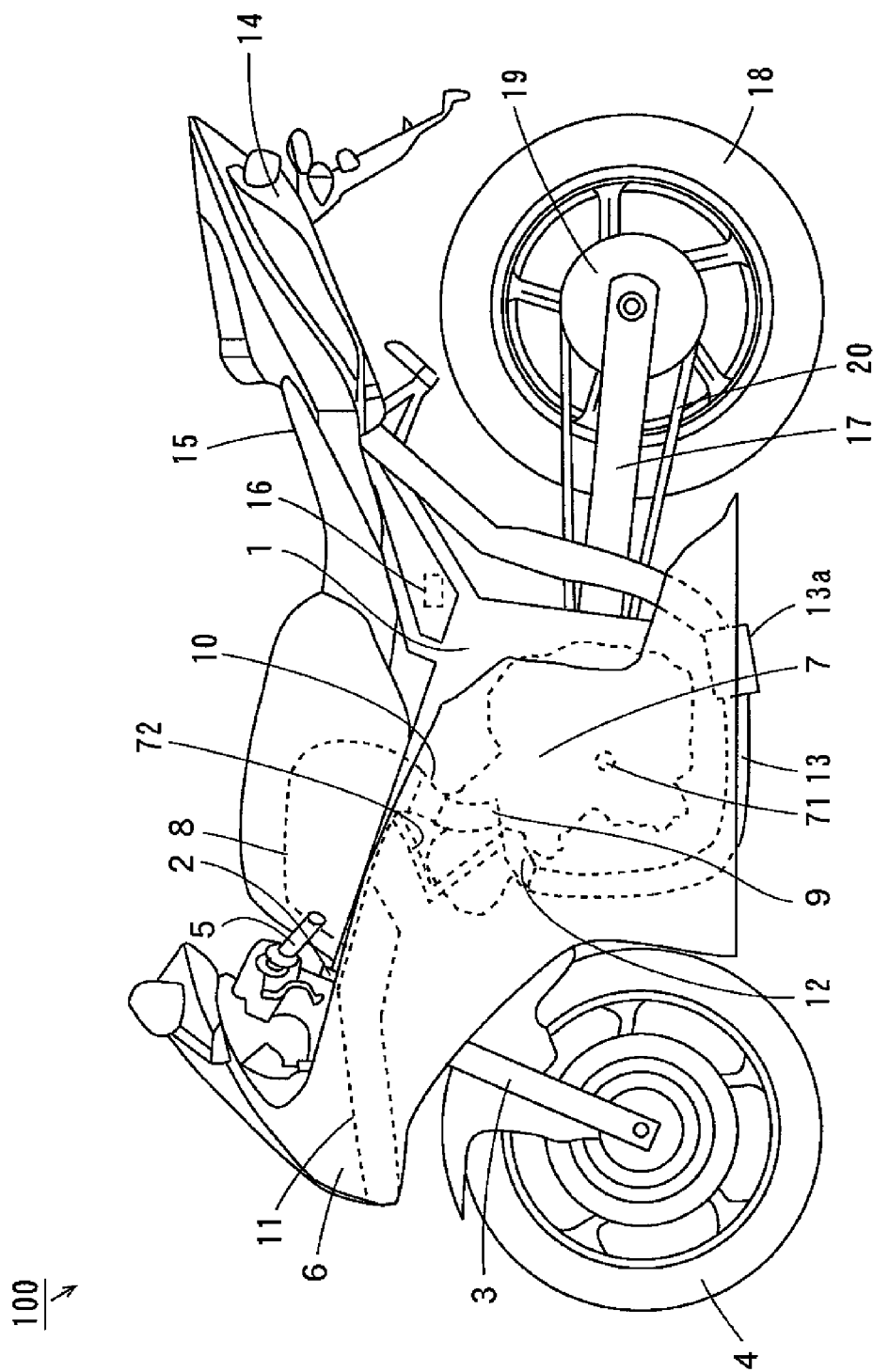
FIG. 1 is an external side view showing a motorcycle including a secondary air supply system according to a preferred embodiment of the present invention.

Hereinafter, description is made of a secondary air supply system and a vehicle including the same according to preferred embodiments of the present invention while referring to the drawings. Note that description is made of a motorcycle only as an example of the vehicle in the following description.

(1) Configuration of Motorcycle

FIG. 1 is an external side view showing the motorcycle including the secondary air supply system according to a preferred embodiment of the present invention.

As shown in FIG. 1, the motorcycle 100 includes a main frame 1. The main frame 1 is provided with a head pipe 2 at its front end. The head pipe 2 is provided with a front fork 3 that can turn. A front wheel 4 is rotatably supported at a lower end of the front fork 3. A handle 5 is attached to an upper end of the head pipe 2.

A cowling 6 is arranged so as to cover a front and sides of the main frame 1. An engine 7 is provided at the center of the main frame 1. An air cleaner box 8 is provided above the engine 7. A throttle body 10 is arranged so as to connect the air cleaner box 8 and an intake port 9 of the engine 7.

An intake passage 11 that communicates the inside of the air cleaner box 8 and the outside is arranged so as to be covered with the cowling 6 at the front of the motorcycle 100. An end of the intake passage 11 opens at a front surface of the cowling 6. Thus, outside air is taken into the engine 7 through the intake passage 11, the air cleaner box 8, the throttle body 10, and the intake port 9.

An end of an exhaust pipe 13 is connected to an exhaust port 12 of the engine 7. A catalyst device 13a for purifying an exhaust gas exhausted from the engine 7 is inserted in the exhaust pipe 13. The catalyst device 13a is preferably composed of a three-way catalyst, for example. A muffler device 14 is connected to the other end of the exhaust pipe 13. The exhaust gas in the engine 7 is exhausted to the outside through the exhaust port 12, the exhaust pipe 13, and the muffler device 14.

A seat 15 is provided above the engine 7. An ECU (Electronic Control Unit) 16 that controls operations of each component of the motorcycle 100 is provided below the seat 15. Details of the ECU 16 will be described below.

A rear arm 17 is connected to the main frame 1 so as to extend toward the back of the engine 7. The rear arm 17 holds a rear wheel 18 and a rear wheel driven sprocket 19 in a rotatable manner. A torque of a crankshaft 71 of the engine 7 is transmitted to the rear wheel driven sprocket 19 through a transmission (not shown) and a chain 20. This causes the rear wheel 18 to rotate.

An air supply pipe 72 is provided at the center of the main frame 1. One end of the air supply pipe 72 is connected to the exhaust port 12, and the other end thereof is connected to the air cleaner box 8. Details of the air supply pipe 72 will be described below.

(2) Configuration of the Secondary Air Supply System

Figure 2:
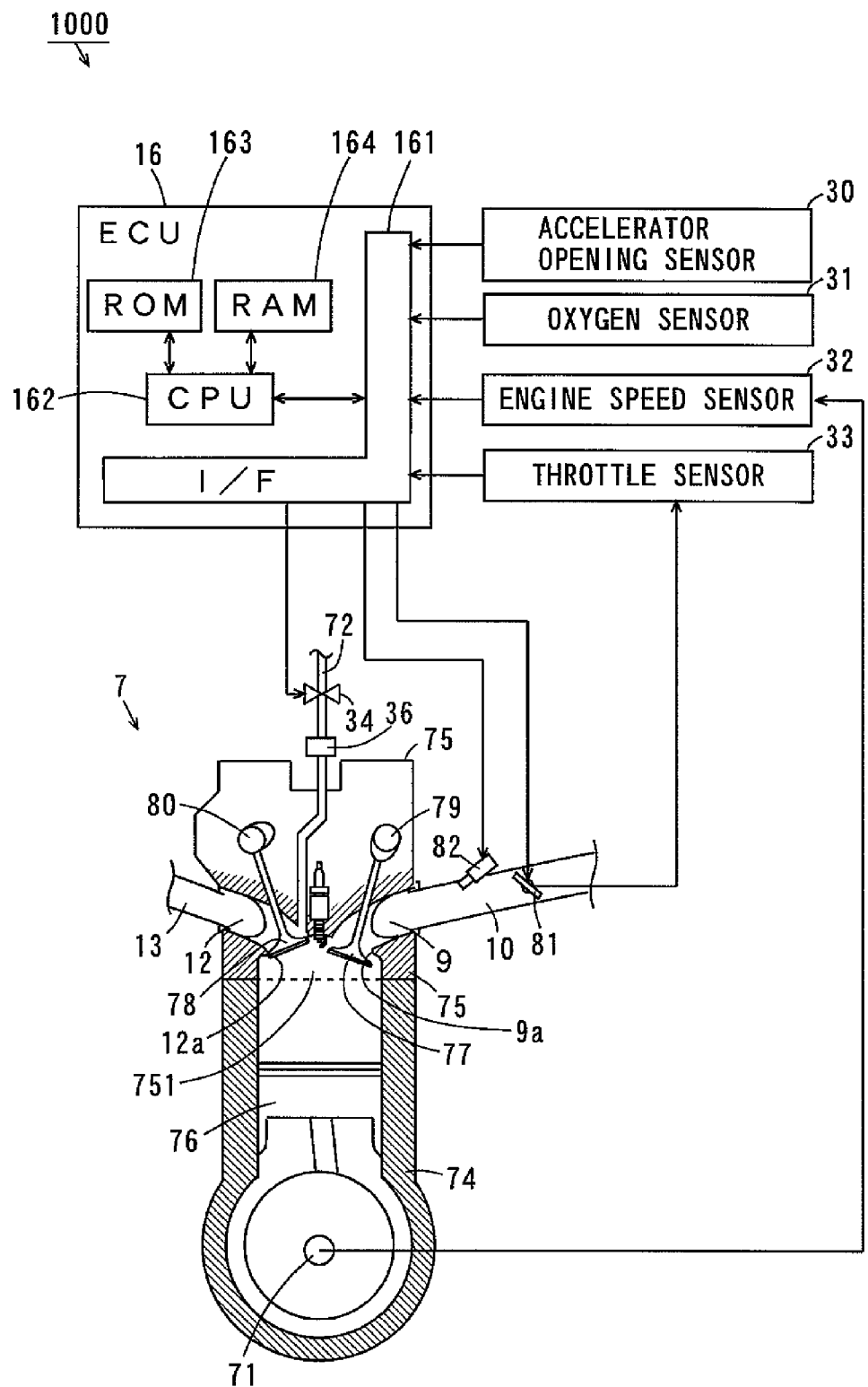
FIG. 2 is a schematic view showing the secondary air supply system.
Figure 3:
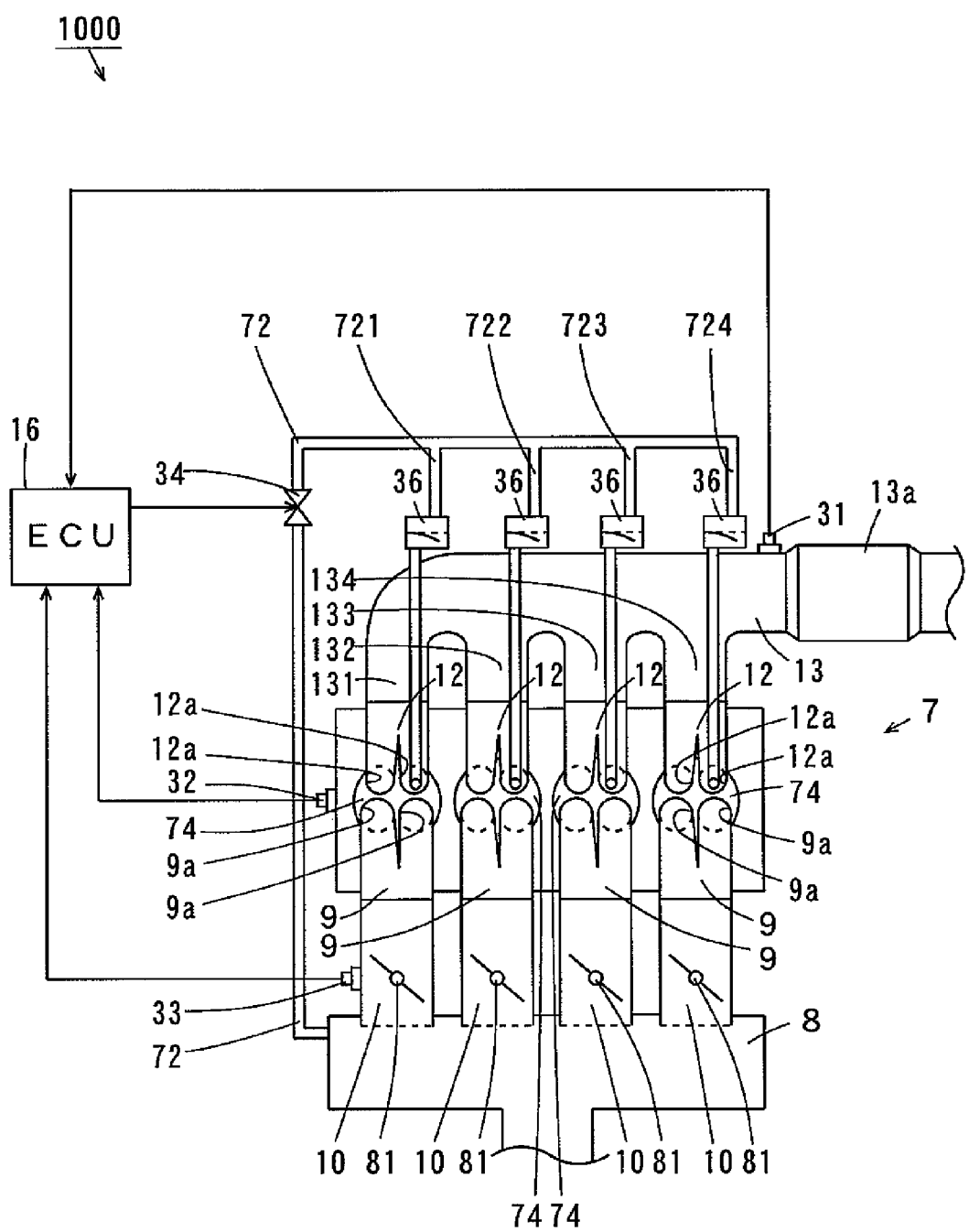
FIG. 3 is a schematic view showing the secondary air supply system.

FIGS. 2 and 3 are schematic views showing the secondary air supply system according to the present preferred embodiment. Note that FIG. 2 shows a vertical sectional view of the engine 7, and FIG. 3 shows a top view of the engine 7.

As shown in FIGS. 2 and 3, the secondary air supply system 1000 according to the present preferred embodiment includes the engine 7, the ECU 16, an accelerator opening sensor 30, an oxygen sensor 31, an engine speed sensor 32, a throttle sensor 33, an air amount adjusting valve 34, a throttle valve 81, and an injector 82.

As shown in FIG. 2, the engine 7 includes a cylinder 74 and a cylinder head 75. A piston 76 is arranged so as to move up and down in the cylinder 74. The piston 76 is coupled to the crankshaft 71 by a connecting rod and a crank (not shown).

A combustion chamber 751 for burning an air-fuel mixture is formed in the cylinder head 75. The intake port 9 and the exhaust port 12 are formed in the cylinder head 75 so as to communicate the combustion chamber 751 and the outside of the cylinder head 75.

An intake valve 77 is provided at a downstream open end 9a of the intake port 9, and an exhaust valve 78 is provided at an upstream open end 12a of the exhaust port 12. An intake valve driving device 79 for driving the intake valve 77 and an exhaust valve driving device 80 for driving the exhaust valve 78 are provided in the cylinder head 75. Note that one cam of the intake valve driving device 79 and one cam of the exhaust valve driving device 80 are shown in FIG. 2. The throttle valve 81 and the injector 82 are provided in the throttle body 10.

As shown in FIG. 3, the engine 7 includes four cylinders 74. The intake port 9, the exhaust port 12, the throttle valve 81, and the injector 82 (see FIG. 2) are provided for each cylinder 74. Each of the intake ports 9 on the cylinder 74 side branches into two passages. Similarly, each of the exhaust ports 12 on the cylinder 74 side branches into two passages. Thus, each of the intake ports 9 has two open ends 9a, and each of the exhaust ports 12 has two open ends 12a. Two intake valves 77 and two exhaust valves 78 of FIG. 2 are provided for each cylinder 74.

As shown in FIG. 3, the exhaust pipe 13 on the upstream side branches into four passages 131 to 134. The passages 131 to 134 are connected to the exhaust ports 12, respectively. One end of the air supply pipe 72 is connected to the air cleaner box 8. The other end of the air supply pipe 72 branches into four passages 721 to 724.

The passages 721 to 724 are connected to the vicinity of first open ends 12a of the exhaust ports 12, respectively. Note that the passages 721 to 724 are preferably connected to the exhaust ports 12, respectively, at positions within about 50 mm from the open ends 12a. In this case, it is possible to cause a portion of the secondary air supplied from the passages 721 to 724 to the exhaust ports 12 to flow into the combustion chamber 751. This stabilizes combustion of the air-fuel mixture in the combustion chamber 751.

In the present preferred embodiment, air in the air cleaner box 8 is supplied to the exhaust ports 12 through the air supply pipe 72. Note that the air supplied from the air cleaner box 8 to the exhaust ports 12 is referred to as secondary air in the following description.

A check valve 36 is provided in each of the passages 721 to 724. This prevents back flow of the exhaust gas from the exhaust ports 12 to the air cleaner box 8. In addition, the air amount adjusting valve 34 is provided upstream of the passages 721 to 724 in the air supply pipe 72.

The accelerator opening sensor 30 (FIG. 2) is positioned in the vicinity of the throttle valve 81 of the throttle body 10, and detects an operation amount (hereinafter referred to as an accelerator opening) of an accelerator grip (not shown) by a driver. The oxygen sensor 31 is provided in the exhaust pipe 13, and detects the oxygen concentration in the exhaust pipe 13. As shown in FIG. 3, the oxygen sensor 31 is provided between the passages 131 to 134 and the catalyst device 13a.

The engine speed sensor 32 (FIGS. 2 and 3) detects a rotational speed (hereinafter referred to as an engine speed) of the engine 7 (the crankshaft 71). The throttle sensor 33 detects the opening of the throttle valves 81 (hereinafter referred to as a throttle opening).

The ECU 16 preferably includes an I/F (interface) 161, a CPU (Central Processing Unit) 162, a ROM (Read Only Memory) 163, and a RAM (Random Access Memory) 164, for example.

The accelerator opening detected by the accelerator opening sensor 30 (FIG. 2), the oxygen concentration detected by the oxygen sensor 31, the engine speed detected by the engine speed sensor 32, and the throttle opening detected by the throttle sensor 33 are supplied to the CPU 162 through the I/F 161. A control program of the CPU 162 is stored in the ROM 163. Various kinds of data related to the secondary air supply system 1000 are stored in the RAM 164. Moreover, the RAM 164 functions as a processing area of the CPU 162.

The CPU 162 controls opening/closing of the throttle valves 81 based on a detected value of the accelerator opening sensor 30. Note that data indicating a relationship between the accelerator opening and the throttle opening is stored in the RAM 164 in the present preferred embodiment. The CPU 162 controls the throttle valves 81 based on the detected value of the accelerator opening sensor 30 and the data stored in the RAM 164.

In the present preferred embodiment, the accelerator grip (not shown) and the throttle valves 81 are mechanically coupled to one another. In this case, since the opening/closing of the throttle valves 81 can be mechanically restricted, an upper limit value of the throttle opening depending on an operation amount of the accelerator grip can be set, for example.

Moreover, the CPU 162 adjusts an air-fuel ratio of the air-fuel mixture in the combustion chamber 751 by controlling the injectors 82. In the present preferred embodiment, the air-fuel ratio of the air-fuel mixture in the combustion chamber 751 is set on a rich side by the CPU 162, for example.

Furthermore, the CPU 162 determines an optimal air-fuel ratio (hereinafter referred to as a target air-fuel ratio) of the exhaust gas in the exhaust ports 12 and the exhaust pipe 13 based on the detected values of the engine speed sensor 32 and the throttle sensor 33. Then, the CPU 162 adjusts the opening of the air amount adjusting valve 34 so that the air-fuel ratio of the exhaust gas in the exhaust ports 12 and the exhaust pipe 13 is the target air-fuel ratio. Accordingly, the amount of the secondary air supplied from the air cleaner box 8 to the exhaust ports 12 is adjusted.

In the present preferred embodiment, information (hereinafter referred to as air-fuel ratio information) indicating a relationship among the engine speed, the throttle opening, and the target air-fuel ratio is stored in the RAM 164. The CPU 162 controls the air amount adjusting valve 34 based on the detected value of the engine speed sensor 32, the detected value of the throttle sensor 33, and the air-fuel ratio information. Details of the control operation of the CPU 162 will be described below.

(3) Relationship Between State of the Engine and the Target Air-Fuel Ratio

Figure 4:
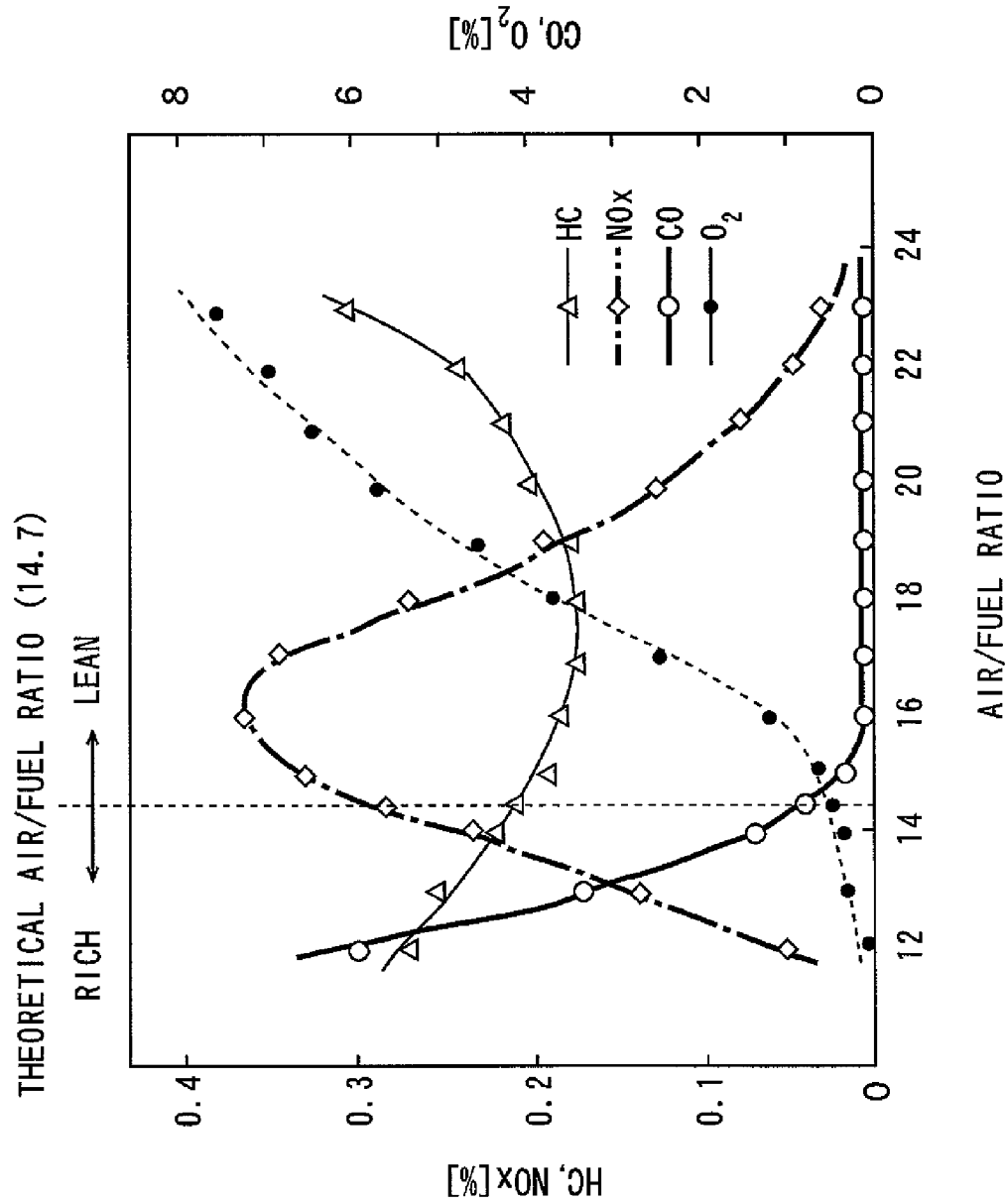
FIG. 4 is a diagram showing examples of respective amounts of HC, NOx, CO and $O_2$ included in an exhaust gas.

FIG. 4 is a diagram showing examples of respective amounts (contents) of HC (hydrocarbon), NOx (nitrogen oxide), CO (carbon monoxide) and $O_2$ (oxygen) included in the exhaust gas of a general engine. Note that in FIG. 4, the ordinate indicates the respective amounts of HC, NOx, CO and $O_2$ in the exhaust gas, and the abscissa indicates the air-fuel ratio (A/F) in the combustion chamber of the engine. In FIG. 4, "Δ" indicates the amount of HC, "◇" indicates the amount of NOx, "○" indicates the amount of CO, and "●" indicates the amount of $O_2$.

Generally, an amount of fuel is controlled so that the air-fuel ratio in the combustion chamber of the engine is a theoretical air-fuel ratio (A/F≈14.7) in a four-wheeled motor vehicle. In this case, the amounts of HC and CO in the exhaust gas tend to be less than the amount of NOx as shown in FIG. 4.

On the other hand, in a motorcycle, the air-fuel ratio of the air-fuel mixture in the combustion chamber is set on the rich side in some cases in order to increase output of the engine and obtain satisfactory drivability. In this case, in the exhaust gas, the amounts of HC and CO increase while the amount of NOx decreases as shown in FIG. 4. Accordingly, it is important to efficiently remove HC and CO in the exhaust gas in order to efficiently purify the exhaust gas in the motorcycle.

Therefore, the secondary air is supplied from the air cleaner box 8 to the exhaust ports 12 in the motorcycle 100 according to the present preferred embodiment. The secondary air promotes oxidation of HC and CO in the exhaust gas. Accordingly, HC and CO are efficiently removed. Description will now be made of characteristics of purification of the exhaust gas by the secondary air that have been discovered by the inventors.

Figure 5:
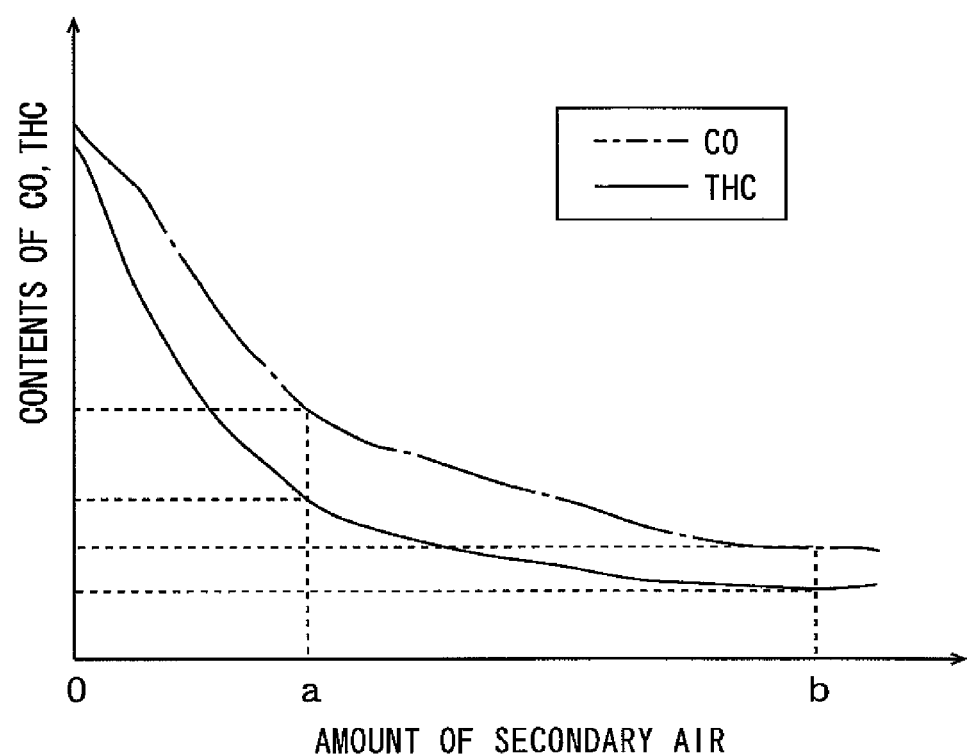
FIG. 5 is a diagram showing characteristics of purification of THC and CO by secondary air.

FIG. 5 is a diagram showing the characteristics of purification of THC (total hydrocarbons) and CO by the secondary air. In FIG. 5, the ordinate indicates the amounts of THC and CO included in the exhaust gas, and the abscissa indicates the amount of the secondary air supplied to the exhaust ports 12. Note that "a" indicates the amount of the secondary air when the air-fuel ratio of the exhaust gas is the theoretical air-fuel ratio (A/F≈14.7), and "b" indicates the amount of the secondary air when the air-fuel ratio of the exhaust gas is 17. In FIG. 5, the one-dot and dash line indicates the amount of CO, and the solid line indicates the amount of THC. Note that FIG. 5 shows the purification characteristics when the air-fuel ratio of the air-fuel mixture in the combustion chamber 751 (FIG. 2) is set to 13.

As shown in FIG. 5, the amounts of THC and CO included in the exhaust gas decrease with an increase in the amount of the secondary air supplied to the exhaust ports 12, and attain respective minimum amounts when the air-fuel ratio of the exhaust gas reaches not less than about 17. In this manner, CO and THC can be efficiently removed by sufficiently supplying the secondary air to the exhaust ports 12. In particular, it is found that CO and THC can be reliably removed by setting the air-fuel ratio of the exhaust gas to about 17.

When the air-fuel ratio of the exhaust gas is constantly set to about 17, however, the amount of oxygen flowing into the catalyst device 13a increases, lowering the efficiency of purifying the exhaust gas by the catalyst device 13a. Therefore, the inventors set the target air-fuel ratio depending on a state of the engine 7 based on various types of simulations, experiments and other suitable methods. This enabled efficient purification of the exhaust gas of the engine 7 (FIG. 1) and improvement of the combustion efficiency (output) of the engine 7. Description will now be made in detail of the target air-fuel ratio that was discovered by the inventors based on the various types of simulations, experiments and other suitable methods.

Figure 6:
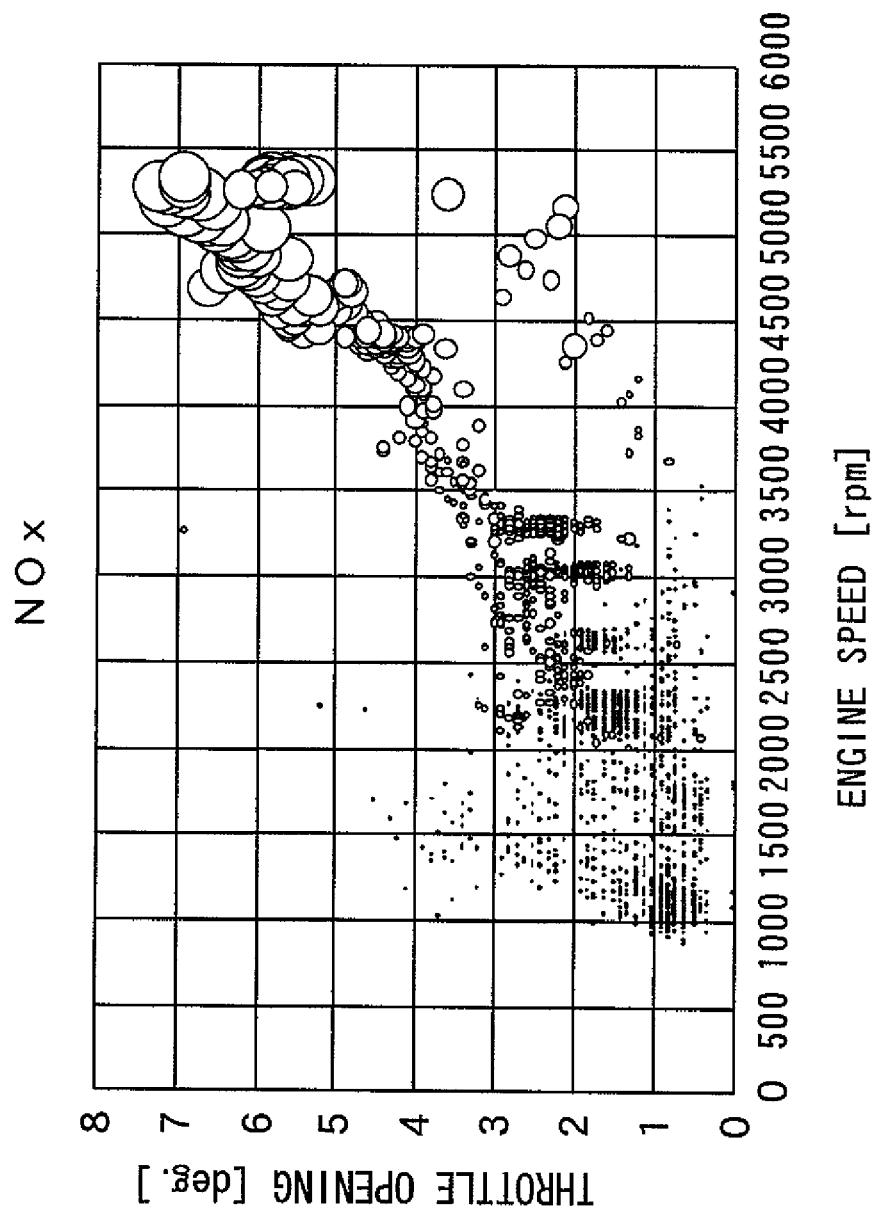
FIG. 6 is a diagram showing a test result based on an NEDC mode.
Figure 7:
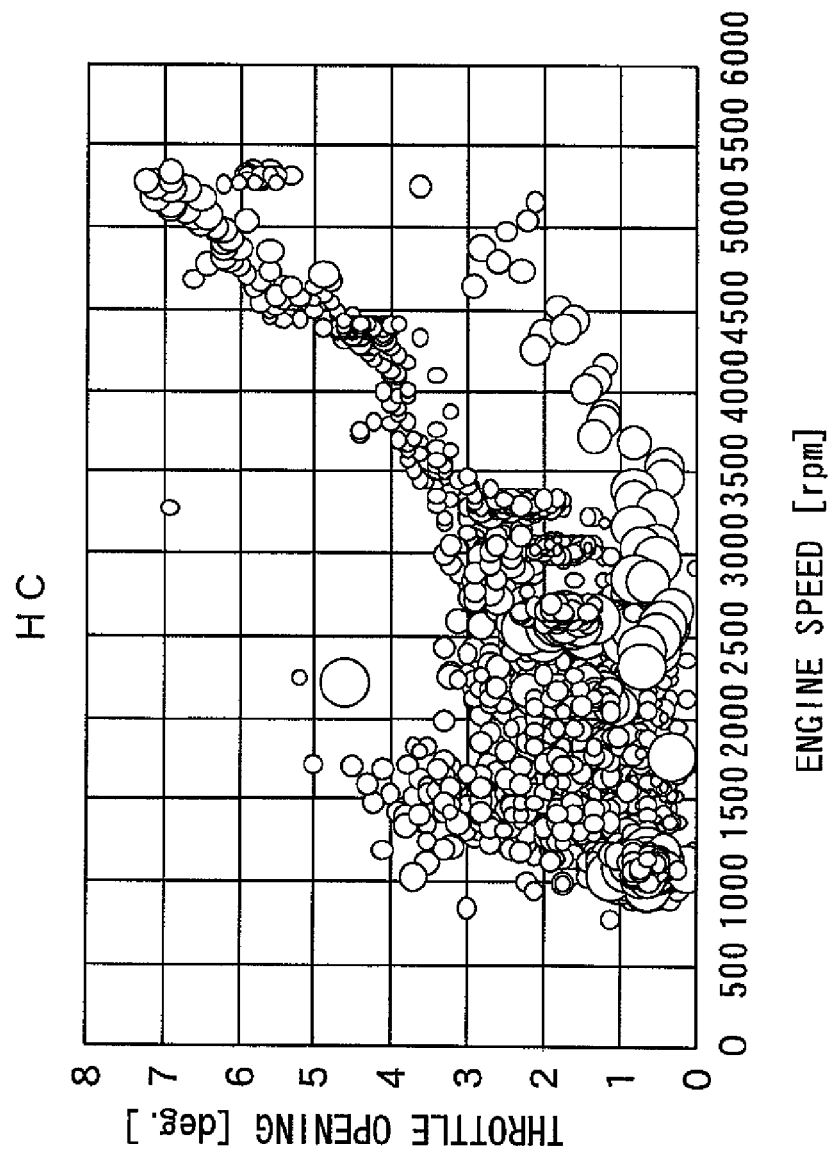
FIG. 7 is a diagram showing a test result based on the NEDC mode.
Figure 8:
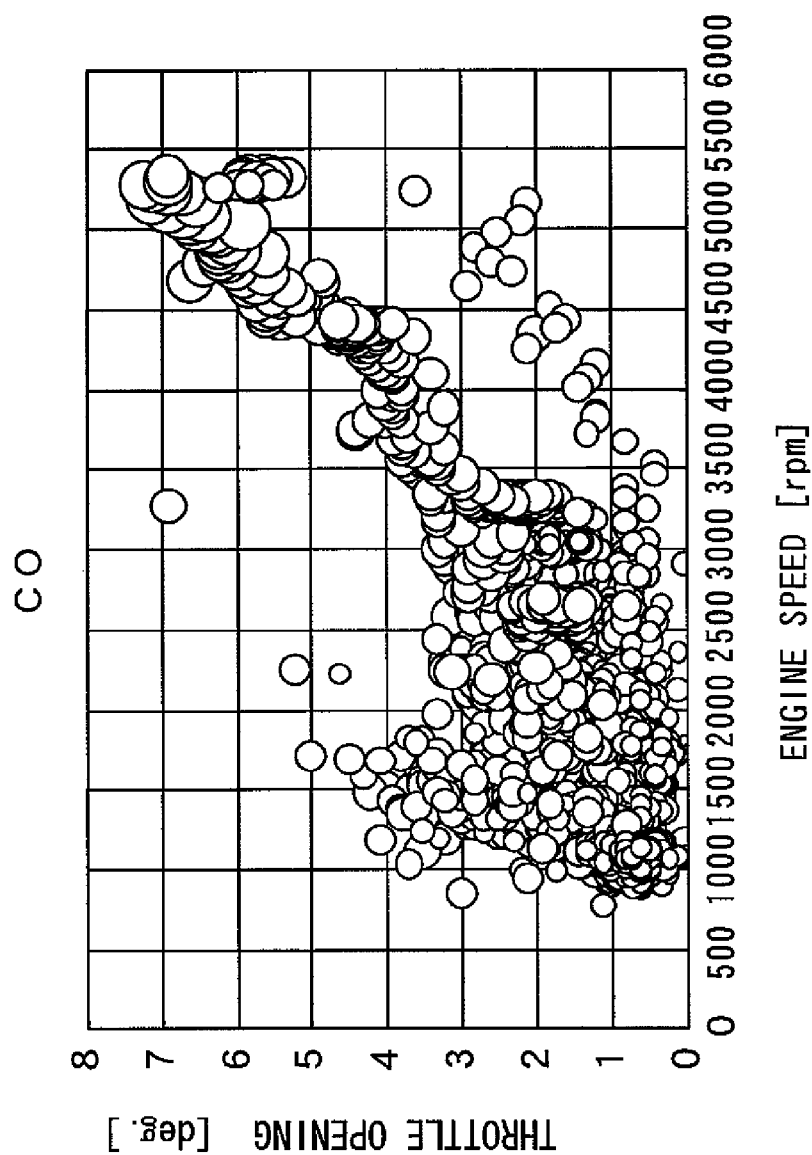
FIG. 8 is a diagram showing a test result based on the NEDC mode.

FIGS. 6 to 8 are diagrams showing test results based on an NEDC (New European Driving Cycle) mode. FIG. 6 shows a result of detection of NOx in the exhaust gas, FIG. 7 shows a result of detection of HC in the exhaust gas, and FIG. 8 shows a result of detection of CO in the exhaust gas. In each of FIGS. 6 to 8, the ordinate indicates the throttle opening and the abscissa indicates the engine speed. Note that in FIGS. 6 to 8, the results of detection of NOx, HC and CO are indicated by "○". The sizes of "○" shown in FIGS. 6 to 8 are proportional to the amount of detection of each component. For example, the amount of detection of NOx is large under a condition where the diameter of "○" is large in FIG. 6.

When the engine 7 is in a high speed and high load state, the amount of NOx exhausted from the engine 7 increases as shown in FIG. 6. When the engine 7 is in a low speed or low load state, the amount of HC exhausted from the engine 7 increases as shown in FIG. 7. The amount of CO exhausted from the engine 7 does not greatly vary as shown in FIG. 8. The inventors set the target air-fuel ratio based on the relationships shown in FIGS. 6 to 8.

Figure 9:
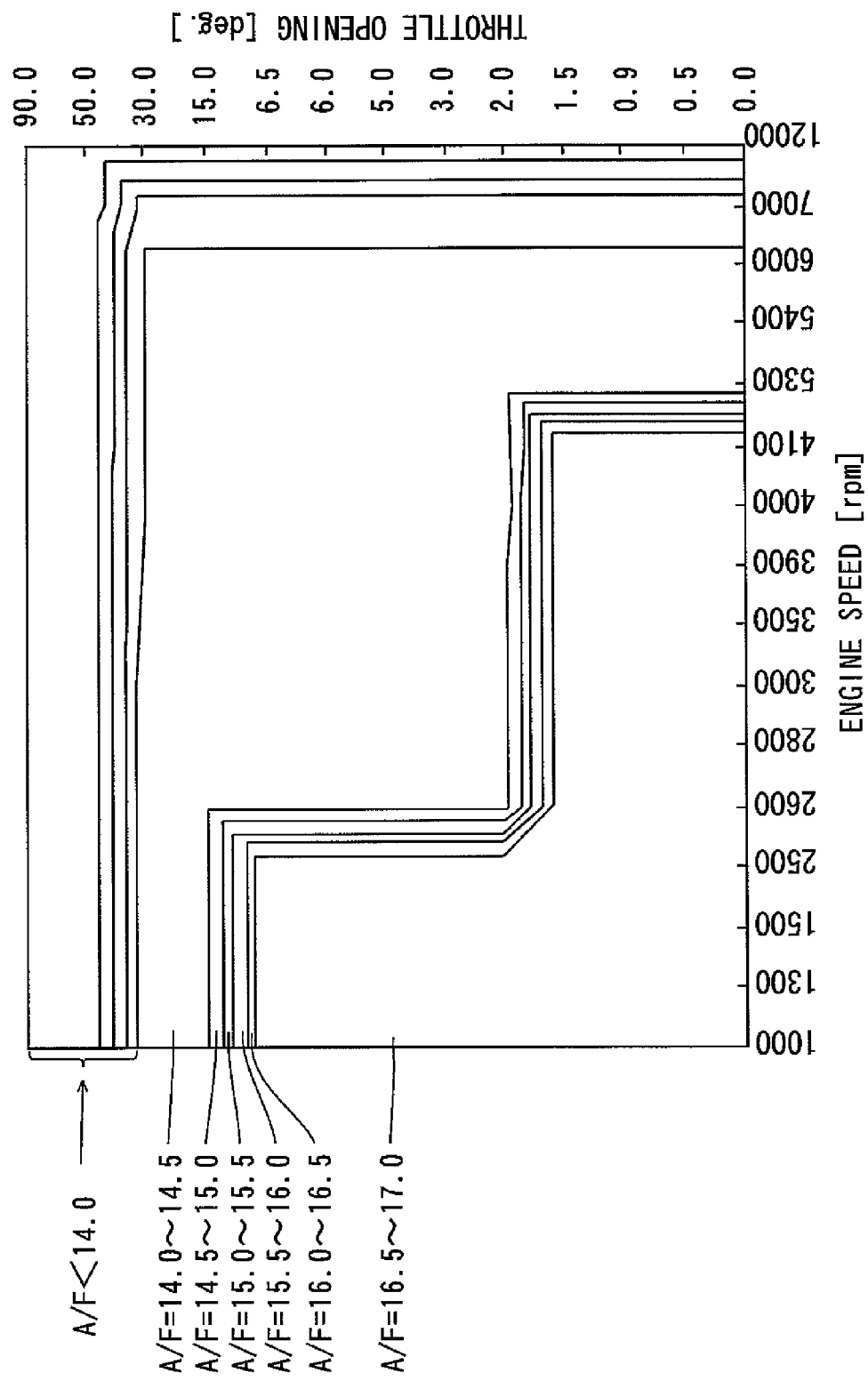
FIG. 9 is a diagram showing an example of air-fuel ratio information stored in a RAM.

FIG. 9 is a diagram showing an example of the air-fuel ratio information stored in the RAM 164. In FIG. 9, the abscissa indicates the engine speed, and the ordinate indicates the throttle opening. Each of the plurality of solid lines in FIG. 9 indicates a transition of the target air-fuel ratio. In the example of FIG. 9, the target air-fuel ratios of the upper four regions of a plurality of regions formed by the plurality of solid lines are less than 14.0. Similarly, the target air-fuel ratios of the other plurality of regions formed by the plurality of solid lines are 14.0 to 14.5, 14.5 to 15.0, . . . , 16.0 to 16.5 and 16.5 to 17.0, respectively. Description will now be made of effects of setting the target air-fuel ratios as shown in FIG. 9.

As described above, the CPU 162 adjusts the opening of the air amount adjusting valve 34 based on the air-fuel ratio information. Specifically, the opening of the air amount adjusting valve 34 is adjusted so that the air-fuel ratio in the exhaust ports 12 is set on the lean side (A/F>15, for example) in the region (see FIG. 6) where the amount of NOx exhausted from the engine 7 is small as shown in FIG. 9.

In this case, the oxidation of HC and CO in the exhaust gas is promoted, and HC and CO are efficiently removed. In addition, since the amount of NOx exhausted from the engine 7 is sufficiently small, NOx can be prevented from being exhausted from the exhaust pipe 13 to the outside. As a result, the exhaust gas can be efficiently purified.

In addition, the oxidation of HC and CO is promoted, so that the temperature of the exhaust gas increases. This allows the temperature of the catalyst device 13a to increase. Accordingly, the catalyst device 13a can be activated in a short period of time even when the temperature of the catalyst device 13a is low (at the time of starting the engine 7, for example). This reliably purifies the exhaust gas.

Moreover, the air-fuel ratio in the exhaust ports 12 is set to substantially a theoretical air-fuel ratio (14.0 to 15.0) in the region (see FIG. 6) where the amount of NOx exhausted from the engine 7 is large as shown in FIG. 9.

In this case, the purification efficiency of the of the catalyst device 13a is maximized, and NOx, HC, and CO in the exhaust gas can be efficiently removed.

Furthermore, the opening of the of the air amount adjusting valve 34 is adjusted so that the air-fuel ratio in the exhaust ports 12 is set on the rich side in the region where the engine speed is high and the region where the throttle opening is large as shown in FIG. 9.

In this case, the oxidation of HC and CO in the exhaust gas is restricted. Accordingly, the increase in the temperature of the exhaust gas due to the oxidation reaction of HC and CO is prevented. As a result, an excessive increase in the temperature of the catalyst device 13*a* is prevented even when the engine 7 is in the high load state, resulting in prevention of a decrease in the purification efficiency of the catalyst device 13*a* and degradation of the catalyst device 13*a*. Note that the opening of the air amount adjusting valve 34 is preferably adjusted so that the temperature of the catalyst device 13*a* does not reach about 900° C. or more, for example.

As described above, the target air-fuel ratio is set based on the engine speed and the throttle opening so that the efficiency of purifying the exhaust gas can be effectively improved.

(4) The Control Operation of the CPU

Next, description is made of the control operation of the CPU 162.

FIG. 10 is a flowchart showing the control operation of the CPU 162.

As shown in FIG. 10, the CPU 162 acquires the engine speed and the throttle opening from the engine speed sensor 32 (FIG. 2) and the throttle sensor 33 (FIG. 2) (Step S1).

Next, the CPU 162 acquires the target air-fuel ratio from the air-fuel ratio information (see FIG. 9) stored in the RAM 164 based on the engine speed and the throttle opening acquired in Step S1 (Step S2).

Then, the CPU 162 adjusts the opening of the air amount adjusting valve 34 by PID (Proportional, Integral, Differential) control based on the target air-fuel ratio acquired in Step S2 (Step S3). Note that the PID control in Step S3 will be described below.

The CPU 162 subsequently acquires the oxygen concentration from the oxygen sensor 31 (FIG. 2) (Step S4). The CPU 162 then calculates the air-fuel ratio (hereinafter referred to as the actual air-fuel ratio) in the exhaust ports 12 based on the oxygen concentration acquired in Step S4 (Step S5).

Next, the CPU 162 calculates a difference between the target air-fuel ratio acquired in Step S2 and the actual air-fuel ratio calculated in Step S5 (Step S6). Then, the CPU 162 determines whether or not an absolute value of the difference calculated in Step S6 is not more than a threshold value (0.1, for example) (Step S7). When the absolute value of the difference calculated in Step S6 is not more than the threshold value, the CPU 162 returns to the process of Step S1.

When it is determined that the difference is more than the threshold value in Step S7, the CPU 162 corrects the opening of the air amount adjusting valve 34 so that the difference between the target air-fuel ratio and the actual air-fuel ratio decreases (Step S8). After that, the CPU 162 returns to the process of Step S4. The CPU 162 repeats the processes of Steps S4 to S8 until it is determined that the absolute value of the difference between the target air-fuel ratio and the actual air-fuel ratio is not more than the threshold value in Step S7.

(5) The PID Control of the Air Amount Adjusting Valve

Next, description is made of the opening adjustment of the air amount adjusting valve 34 (Step S3 of FIG. 10) by the PID control.

FIGS. 11 to 13 are diagrams showing examples of a proportional gain (a coefficient of a P term), an integral gain (a coefficient of an I term) and a differential gain (a coefficient of a D term), respectively, used in the PID control of the air amount adjusting valve 34.

Note that FIG. 11 is a diagram showing a relationship among the engine speed, the throttle opening, and the proportional gain. FIG. 12 is a diagram showing a relationship among the engine speed, the throttle opening, and the integral gain. FIG. 13 is a diagram showing a relationship among the engine speed, the throttle opening, and the differential gain. The relationships shown in FIGS. 11 to 13 are stored in the RAM 164 in advance.

While values of the gains corresponding to 1000 rpm, 1250 rpm, . . . , 5500 rpm, and 6000 rpm at 0 deg, 3 deg, and 90 deg, respectively, are shown in FIGS. 11 to 13, values of the gains corresponding to other engine speeds and throttle openings are calculated by linear interpolation performed by the CPU 162.

As shown in FIGS. 11 to 13, the values of each gain are set depending on the engine speed and the throttle opening in the present preferred embodiment. This allows an opening/closing speed of the air amount adjusting valve 34 to be adjusted depending on the state of the engine 7.

Note that the values of the gains are not limited to the values shown in FIGS. 11 to 13, and can be arbitrarily set depending on a use environment of the engine 7, the configuration of the engine 7, and so on.

The values of each gain may be set so as to decrease when the engine speed is low, for example. In this case, control stability of the air amount adjusting valve 34 can be improved. In addition, the values of each gain may be set so as to increase when the engine speed is high, for example. In this case, control response of the air amount adjusting valve 34 can be improved.

(6) Example of the Configuration of the Air Amount Adjusting Valve

Figure 14:
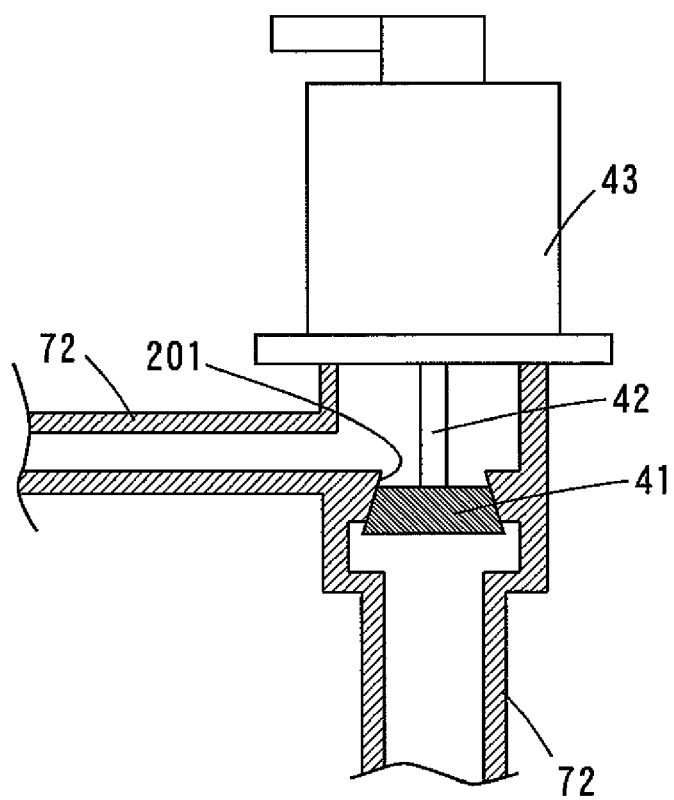
FIG. 14 is a diagram showing an example of an air amount adjusting valve.

FIG. 14 is a diagram showing an example of the air amount adjusting valve 34.

The air amount adjusting valve 34 shown in FIG. 14 includes a flow rate air flow adjustment device 41, a shaft 42, and a shaft driver 43.

As shown in FIG. 14, a passage 201 that is substantially trapezoidal in cross-section is formed in the air supply pipe 72 in this example. The cross-section of the flow rate air flow adjustment device 41 has a trapezoidal shape. The flow rate air flow adjustment device 41 is provided in the passage 201. Note that the area of an upper portion of the passage 201 is smaller than the area of an upper surface of the flow rate air flow adjustment device 41.

One end of the shaft 42 is connected to the upper surface of the flow rate air flow adjustment device 41, and the other end is connected to the shaft driver 43. The shaft driver 43 includes a motor and so on, and moves the shaft 42 up and down by the control of the CPU 162. Accordingly, the flow rate air flow adjustment device 41 moves up and down in the passage 201.

Here, both the cross-sectional area of the flow rate air flow adjustment device 41 and the cross-sectional area of the passage 201 are gradually increased downward. Thus, the flow rate air flow adjustment device 41 moves up and down in the passage 201, thereby causing the cross-sectional area of a gap between an outer peripheral surface of the flow rate air flow adjustment device 41 and an inner peripheral surface of the passage 201 to vary. Accordingly, the amount of the secondary air flowing through the passage 201 is adjusted. As a result, the amount of the secondary air supplied from the air cleaner box 8 (FIG. 3) to the exhaust ports 12 (FIG. 3) is adjusted.

(7) Effects of the Present Preferred Embodiment

As described above, the ideal air-fuel ratio (target air-fuel ratio) in the exhaust ports 12 set depending on the state of the engine 7 is stored in the RAM 164 in advance in the present preferred embodiment. The CPU 162 adjusts the amount of the secondary air supplied to the exhaust ports 12 according to the target air-fuel ratio. Specifically, when the amount of NOx exhausted from the engine 7 is small, the target air-fuel ratio is set on the lean side. Accordingly, the unburned components (HC and CO) in the exhaust gas can be efficiently removed.

In addition, since the unburned components in the exhaust gas can be removed by the secondary air, the size of the catalyst device 13a can be reduced. As a result, the manufacturing cost of the motorcycle 100 can be reduced.

Moreover, when the amount of NOx exhausted from the engine 7 is large, the target air-fuel ratio is set to substantially the theoretical air-fuel ratio. This improves the efficiency of purifying the exhaust gas by the catalyst device 13a.

When the engine 7 is at high load, the target air-fuel ratio is set on the rich side. This prevents the excessive oxidation reaction of the unburned components in the exhaust ports 12 so that the increase in the temperature of the exhaust gas can be prevented. As a result, the excessive increase in the temperature of the catalyst device 13a can be prevented, thus improving reliability of the catalyst device 13a.

As a result of the above-described features, the air-fuel ratio in the exhaust ports 12 can be appropriately set depending on the state of the engine 7. This allows the efficiency of purifying the exhaust gas to be effectively improved.

(8) Modifications

While the air-fuel ratio of the exhaust gas is calculated by the CPU 162 based on the detected value of the oxygen sensor 31 in the above-described preferred embodiments, the air-fuel ratio of the exhaust gas may be calculated based on an amount of fuel injected by the injectors 82 and the amount of air taken into the combustion chamber 751. Note that the amount of the air taken into the combustion chamber 751 can be detected by providing intake air pressure sensors in the intake ports 9.

In addition, while the state of the engine 7 is determined based on the engine speed and the throttle opening in the above-described preferred embodiments, the method of determining the state of the engine 7 is not limited to the above-described examples. For example, pressure sensors may be provided in the intake ports 9, and the CPU 162 may determine the state of the engine 7 based on the pressure (negative pressure) in the intake ports 9 detected by the pressure sensors and the engine speed. Note that in this case, a relationship among the engine speed, the pressure in the intake ports 9, and the target air-fuel ratio is stored in the RAM 164.

Moreover, NOx sensors may be provided in the exhaust ports 12 or the exhaust pipe 13, and the CPU 162 may determine the state of the engine 7 based on the amount of NOx detected by the NOx sensors, for example. Note that in this case, a relationship between the amount of NOx and the target air-fuel ratio is stored in the RAM 164.

Furthermore, temperature sensors may be provided in the vicinity of the open ends 12a of the exhaust ports 12, and the CPU 162 may determine the state of the engine 7 based on the temperature of the exhaust gas detected by the temperature sensors, for example. Note that in this case, a relationship between the temperature of the exhaust gas and the target air-fuel ratio is stored in the RAM 164.

In addition, while the throttle valve 81 is electrically opened/closed by the CPU 162 in the above-described preferred embodiments, the throttle valve 81 may be mechanically opened/closed.

While description is made of a case where the one oxygen sensor 31 is preferably provided in the exhaust pipe 13 in the above-described preferred embodiments, the oxygen sensor 31 may be provided for each cylinder 74. For example, the oxygen sensor 31 may be provided in each of the passages 131 to 134.

While description is made of the secondary air supply system 1000 preferably including a four-cylinder engine in the above-described preferred embodiments, the engine 7 is not limited to a four-cylinder engine. For example, a two-cylinder engine, a six-cylinder engine, an eight-cylinder engine and the like may be used. The engine 7 may be a single-cylinder engine.

While the air-fuel ratio of the exhaust gas is corrected preferably by adjusting the amount of fuel injected by the injectors 82 in the above-described preferred embodiments, the air-fuel ratio of the exhaust gas may be corrected by adjusting the throttle opening or adjusting the throttle opening and the amount of injected fuel.

While the air cleaner box 8 is preferably used as the supply source of the secondary air in the above-described preferred embodiments, the supply source of the secondary air is not limited to the air cleaner box 8. The throttle body 10 may be used as the supply source of the secondary air, for example.

While description is made of a case where the secondary air supply system 1000 is preferably provided in the motorcycle 100 in the above-described preferred embodiments, the secondary air supply system 1000 may be provided in another vehicle such as a three wheeled vehicle or a four wheeled vehicle.

The opening/closing of the air amount adjusting valve 34 preferably has hysteresis characteristics. In this case, unnecessary opening/closing of the air amount adjusting valve 34 can be prevented. This prevents degradation of the air amount adjusting valve 34.

The secondary air may be supplied so that the air-fuel ratio of the exhaust gas is not on the rich side (insufficient oxygen). In this case, the unburned components (HC and CO) in the exhaust gas can be prevented from being exhausted to the outside.

The CPU 162 may correct the amount of fuel injected by the injectors 82 based on the detected value of the oxygen sensor 31 in order to adjust the air-fuel ratio of the exhaust gas in the exhaust ports 12. This reliably causes the air-fuel ratio of the exhaust gas in the exhaust ports 12 to be the target air-fuel ratio.

The air amount adjusting valve 34 may be closed by the control of the CPU in a region where the engine 7 is at high load. In this case, supply of the secondary air to the exhaust ports 12 is stopped, so that the oxidation of HC and CO in the exhaust gas is suppressed. Accordingly, the increase in the temperature of the exhaust gas because of the oxidation reaction of HC and CO is prevented. As a result, the excessive increase in the temperature of the catalyst device 13a is prevented, and the low purification efficiency of the catalyst device 13a and the degradation of the catalyst device 13a are prevented. Note that the air amount adjusting valve 34 is preferably closed so that the temperature of the catalyst device 13a does not reach about 900° C. or more, for example.

While description is made of a case where the air-fuel ratio in the exhaust ports 12 preferably is set to not more than about 17 in FIG. 9, the air-fuel ratio in the exhaust ports 12 may be set larger than about 17. For example, the air-fuel ratio in the exhaust ports 12 may be set to about 19.

(9) Another Example of the Air Amount Adjusting Valve

Figure 15A:
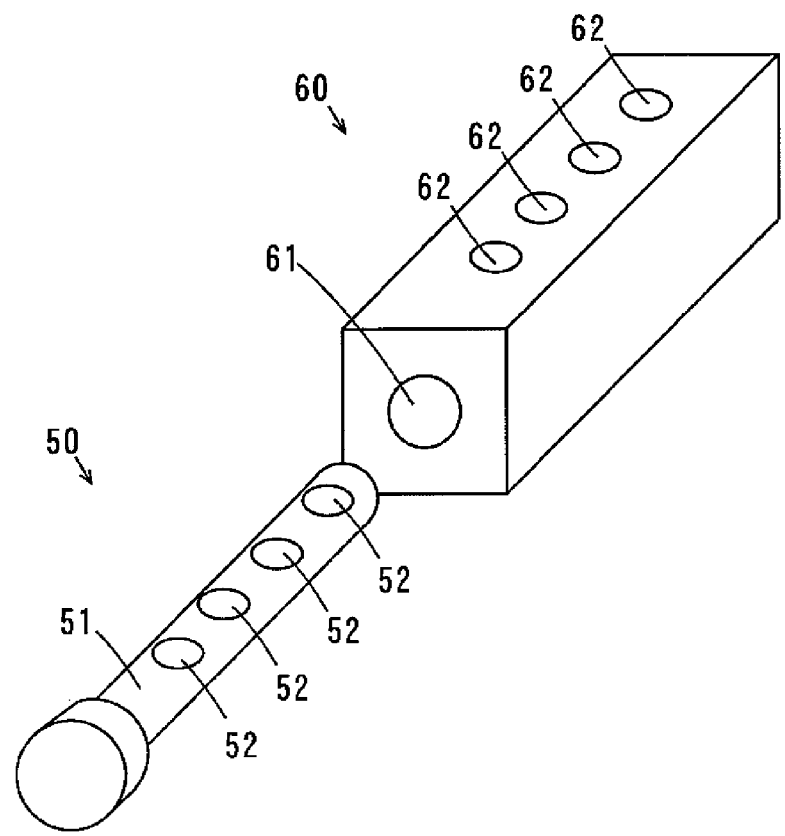
FIGS. 15A and 15B are diagrams showing another example of the air amount adjusting valve.
Figure 15B:
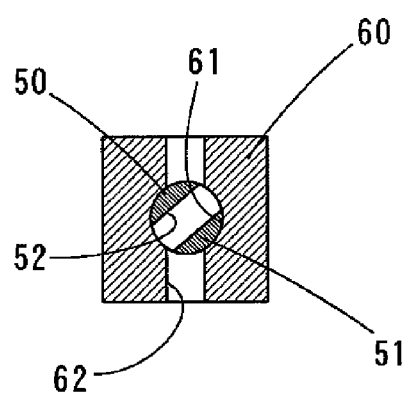

FIGS. 15A and 15B are diagrams showing another example of the air amount adjusting valve 34. FIG. 15A is an exploded perspective view of the air amount adjusting valve 34, and FIG. 15B is a sectional view of the air amount adjusting valve 34.

The air amount adjusting valve 34 shown in FIGS. 15A and 15B includes a rotating member 50 and a fixing member 60. The rotating member 50 includes a cylinder 51 with a circular cross-section. Four through holes 52 are provided in the cylinder 51. The rotating member 50 is rotated by a rotation driving mechanism (not shown) including a motor and so on.

The fixing member 60 has a hole 61 with a cylindrical shape formed so as to extend in an axis direction. In addition, four through holes 62 are provided in the fixing member 60 so as to extend in a radial direction of the hole 61.

The cylinder 51 is inserted into the hole 61 such that the through holes 52 and the through holes 62 vertically overlap with one another, respectively.

The air amount adjusting valve 34 of this example is placed in each of the passages 721 to 724 (FIG. 3). Specifically, the air amount adjusting valve 34 is placed in each of the passages 721 to 724 such that the through holes 62 are part of each of the passages 721 to 724.

In the air amount adjusting valve 34, the rotating member 50 is rotated by the control of the CPU 162. This causes the area of a portion that communicates the through hole 52 and the through hole 62 to vary as shown in FIG. 15B. As a result, the amount of the secondary air flowing through the passages 721 to 724 is adjusted.

(10) Another Example of a Method of Controlling the Air Amount Adjusting Valve

While the air amount adjusting valve 34 is controlled by an arithmetic operation performed by the CPU 162 in the above-described preferred embodiments, the air amount adjusting valve 34 may be controlled by an arithmetic operation using a plurality of electronic circuits. Hereinafter, description will be made while referring to the drawings.

Figure 16:
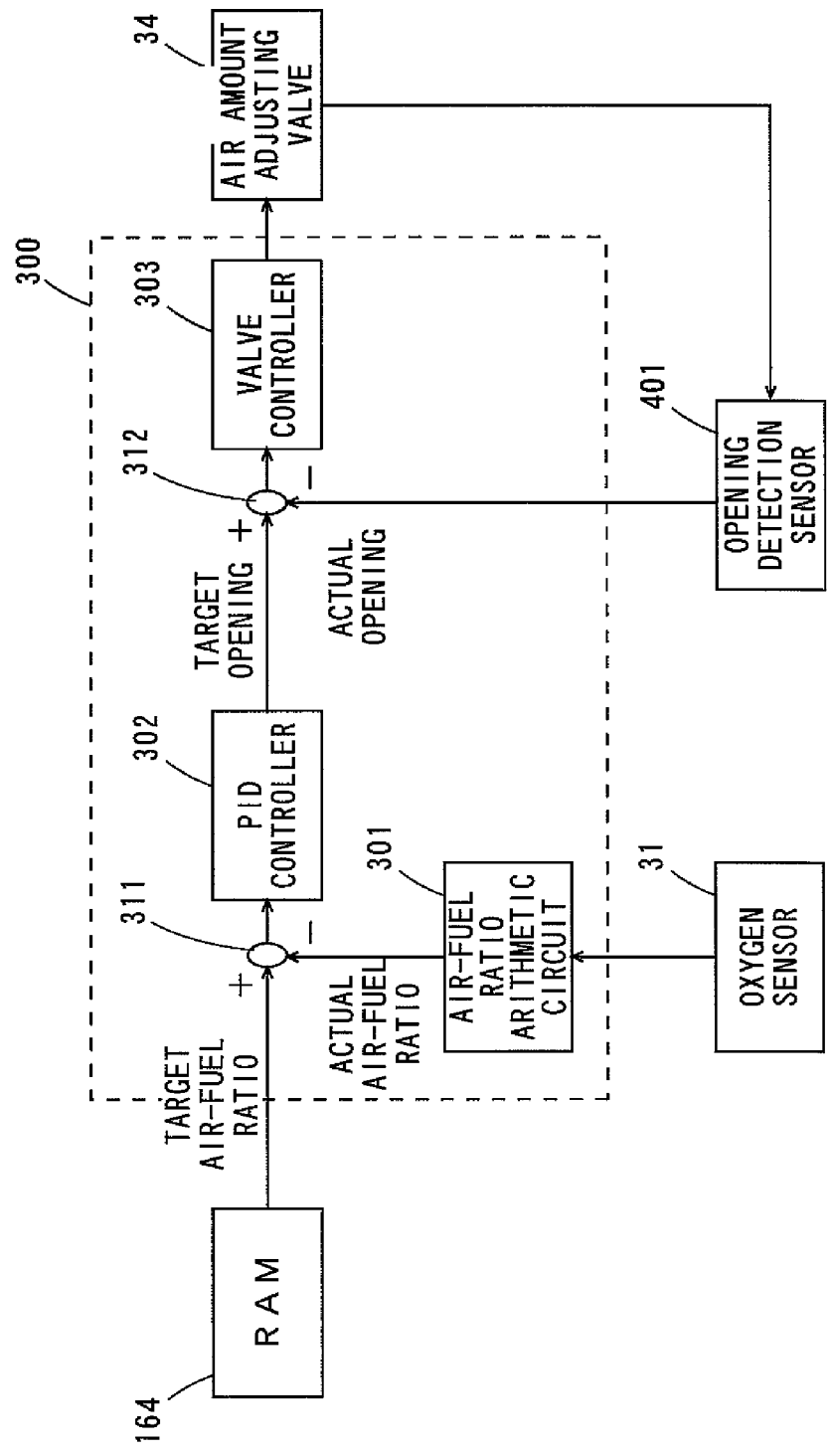
FIG. 16 is a block diagram showing the functional configuration of an arithmetic processing unit.

FIG. 16 is a block diagram showing the functional configuration of an arithmetic processing unit implemented by the plurality of electronic circuits.

As shown in FIG. 16, the arithmetic processing unit 300 includes an air-fuel ratio arithmetic circuit 301, a PID controller 302, a valve controller 303, and arithmetic elements 311, 312. The arithmetic processing unit 300 is provided in the ECU 16 (FIG. 2), for example.

Note that the RAM 164, the oxygen sensor 31, and the air amount adjusting valve 34 shown in FIG. 16 have the same configurations as the RAM 164, the oxygen sensor 31, and the air amount adjusting valve 34 described in FIG. 2, respectively.

In addition, the opening of the air amount adjusting valve 34 is detected by an opening detection sensor 401 in this example. Note that the opening of the air amount adjusting valve 34 detected by the opening detection sensor 401 is referred to as the actual opening in the following description.

The air-fuel ratio arithmetic circuit 301 calculates the current air-fuel ratio (actual air-fuel ratio) in the exhaust ports 12 (FIG. 2) based on the oxygen concentration detected by the oxygen sensor 31. The arithmetic element 311 calculates a difference value between the target air-fuel ratio stored in the RAM 164 and the actual air-fuel ratio calculated by the air-fuel ratio arithmetic circuit 301. The PID controller 302 calculates the opening (hereinafter referred to as the target opening) of the air amount adjusting valve 34 by a PID arithmetic operation based on the difference value calculated by the arithmetic element 311.

The arithmetic element 312 calculates a difference value between the target opening calculated by the PID controller 302 and the actual opening detected by the opening detection sensor 401. The valve controller 303 determines an adjustment amount of the air amount adjusting valve 34 based on the difference value calculated by the arithmetic element 312, and controls the air amount adjusting valve 34 based on the adjustment amount.

As described above, feedback control based on the air-fuel ratio in the exhaust ports 12 and feedback control based on the opening of the air amount adjusting valve 34 are performed according to the arithmetic processing of this example. This enables control of the air amount adjusting valve 34 with high reliability.

(11) Correspondences Between Elements in the Claims and Elements in the Preferred Embodiments of the Present Invention In the following paragraph, non-limiting examples of correspondences between various elements recited in the claims below and those described above with respect to various preferred embodiments of the present invention are explained.

In the above-described preferred embodiments, the exhaust port 12 and the exhaust pipe 13 are examples of an exhaust passage, the air cleaner box 8 or the throttle body 10 is an example of a supply source, the air supply pipe 72 is an example of a supply passage, the CPU 162 is an example of an engine state determination device, the ROM 163 or the RAM 164 is an example of a storage device, the CPU 162 and the air amount adjusting valve 34 or the arithmetic processing unit 300 and the air amount adjusting valve 34 are examples of an air flow adjustment device, the NOx sensor is an example of a first detector, the oxygen sensor 31 is an example of a second detector, the rear wheel 18 is an example of a drive wheel, and the rear wheel driven sprocket 19 and the chain 20 are examples of a transmission mechanism.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A secondary air supply system that supplies secondary air to an exhaust passage of an engine, comprising:
   a supply source of the secondary air;
   a supply passage through which the secondary air is supplied from the supply source to the exhaust passage;
   an engine state determination device arranged to determine a state of the engine;
   a storage device arranged to store a target air-fuel ratio set in advance depending on the state of the engine; and
   an air flow adjustment device arranged to adjust, based on the state of the engine determined by the engine state determination device and the target air-fuel ratio stored in the storage device, an amount of the secondary air to be supplied from the supply passage to the exhaust passage so that an air-fuel ratio in the exhaust passage is the target air-fuel ratio; wherein
   the state of the engine includes a first state and a second state set in advance based on an amount of nitrogen oxide exhausted from a combustion chamber of the engine, and a third state set in advance based on a load applied on the engine;

the amount of the nitrogen oxide exhausted in the first state is smaller than the amount of the nitrogen oxide exhausted in the second state, and the load applied on the engine in the third state is higher than a load applied on the engine in the first and second states; and the target air-fuel ratio includes a first air-fuel ratio corresponding to the first state, a second air-fuel ratio corresponding to the second state, and a third air-fuel ratio corresponding to the third state, the first air-fuel ratio is leaner than the second air-fuel ratio, and the second air-fuel ratio is leaner than the third air-fuel ratio.

2. The secondary air supply system according to claim 1, further comprising a throttle valve arranged to adjust an intake amount of the engine, wherein the engine state determination device determines the state of the engine based on a rotational speed of the engine and an opening of the throttle valve.

3. The secondary air supply system according to claim 1, wherein the engine state determination device determines the state of the engine based on the rotational speed of the engine and a pressure in an intake port of the engine.

4. The secondary air supply system according to claim 1, further comprising a first detector arranged to detect the amount of the nitrogen oxide exhausted from the combustion chamber of the engine, wherein the engine state determination device determines the state of the engine based on the amount of the nitrogen oxide detected by the first detector.

5. The secondary air supply system according to claim 1, wherein the air flow adjustment device interrupts the supply of the secondary air from the supply passage to the exhaust passage when the state of the engine is determined to be the third state by the engine state determination device.

6. The secondary air supply system according to claim 1, further comprising a second detector arranged to detect an oxygen concentration in the exhaust passage, wherein the air flow adjustment device corrects a supply amount of the secondary air from the supply passage to the exhaust passage based on the oxygen concentration detected by the second detector.

7. The secondary air supply system according to claim 1, wherein the first air-fuel ratio is not less than about 15.

8. The secondary air supply system according to claim 1, wherein the second air-fuel ratio is substantially a theoretical air-fuel ratio.

9. The secondary air supply system according to claim 1, wherein the supply passage is connected to the exhaust passage at a position within about 50 mm from the combustion chamber of the engine.

10. A vehicle comprising:
an engine;
a drive wheel;
a transmission mechanism arranged to transmit power generated by the engine to the drive wheel;
an exhaust passage through which an exhaust gas exhausted from the engine flows;
a catalyst device that is provided in the exhaust passage and arranged to purify the exhaust gas exhausted from the engine; and
a secondary air supply system arranged to supply secondary air to the exhaust passage, wherein the secondary air supply system includes:
a supply source of the secondary air;
a supply passage through which the secondary air is supplied from the supply source to the exhaust passage;
an engine state determination device arranged to determine a state of the engine;
a storage device arranged to store a target air-fuel ratio set in advance depending on the state of the engine; and
an air flow adjustment device arranged to adjust, based on the state of the engine determined by the engine state determination device and the target air-fuel ratio stored in the storage device, an amount of the secondary air to be supplied from the supply passage to the exhaust passage so that an air-fuel ratio in the exhaust passage is the target air-fuel ratio; wherein the state of the engine includes a first state and a second state set in advance based on an amount of nitrogen oxide exhausted from a combustion chamber of the engine, and a third state set in advance based on a load applied on the engine;

the amount of the nitrogen oxide exhausted in the first state is smaller than the amount of the nitrogen oxide exhausted in the second state, and the load applied on the engine in the third state is higher than a load applied on the engine in the first and second states; and the target air-fuel ratio includes a first air-fuel ratio corresponding to the first state, a second air-fuel ratio corresponding to the second state, and a third air-fuel ratio corresponding to the third state, the first air-fuel ratio is leaner than the second air-fuel ratio, and the second air-fuel ratio is leaner than the third air-fuel ratio.

* * * * *